No. 763,774. PATENTED JUNE 28, 1904.
M. C. MASSIE.
ALTERNATING CURRENT MOTOR.
APPLICATION FILED FEB. 12, 1904.
NO MODEL. 4 SHEETS—SHEET 1.
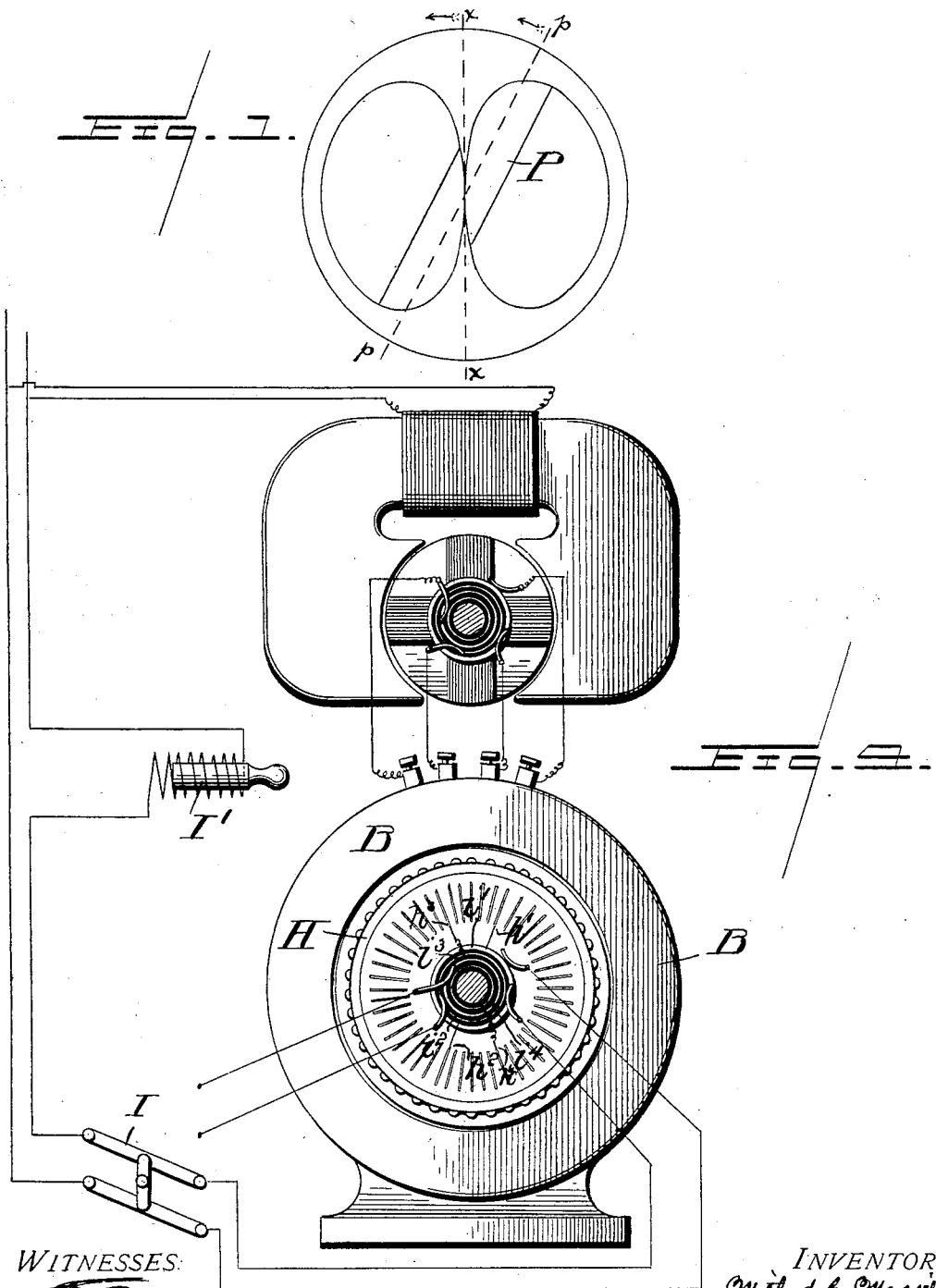

No. 763,774. PATENTED JUNE 28, 1904.
M. C. MASSIE.
ALTERNATING CURRENT MOTOR.
APPLICATION FILED FEB. 12, 1904.
NO MODEL. 4 SHEETS—SHEET 2.
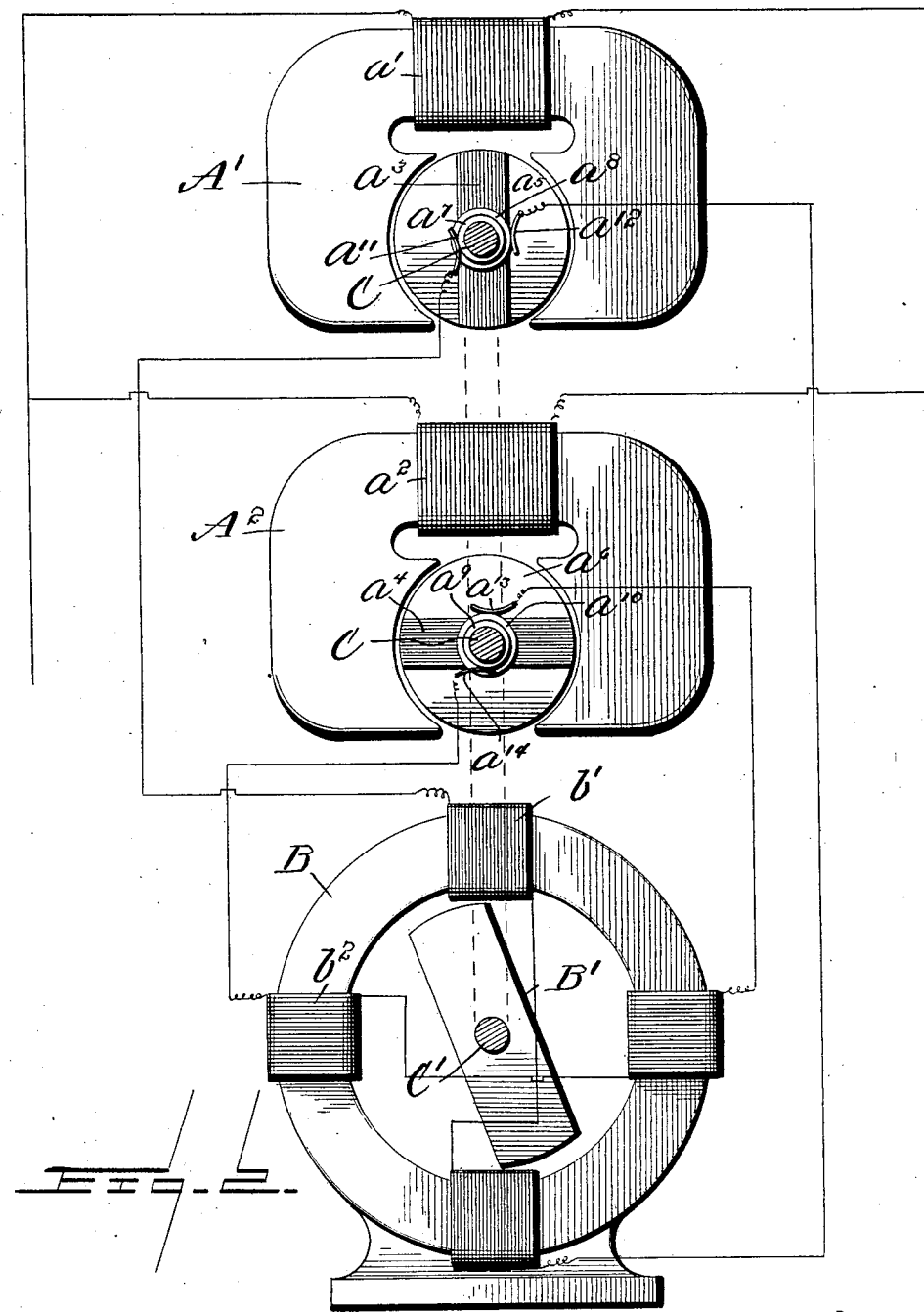

No. 763,774. PATENTED JUNE 28, 1904.
M. C. MASSIE.
ALTERNATING CURRENT MOTOR.
APPLICATION FILED FEB. 12, 1904.
NO MODEL. 4 SHEETS—SHEET 3.
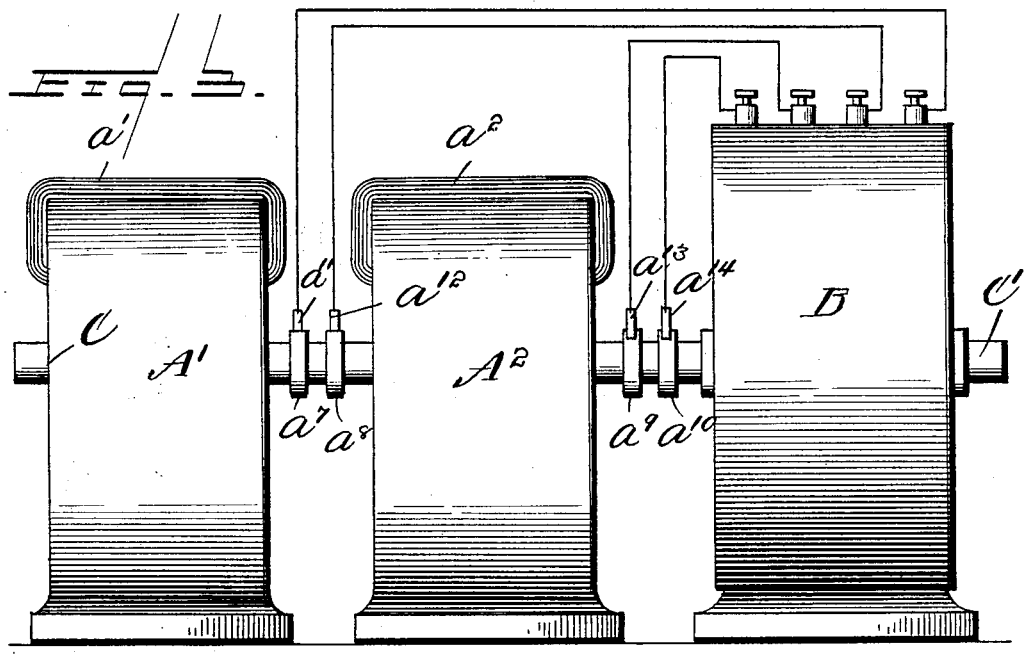
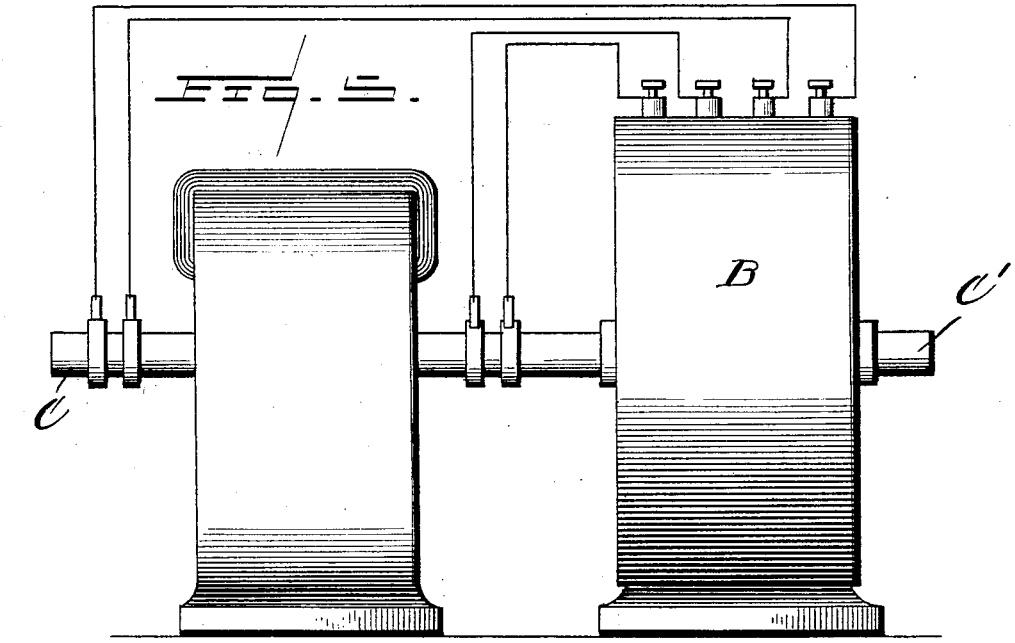

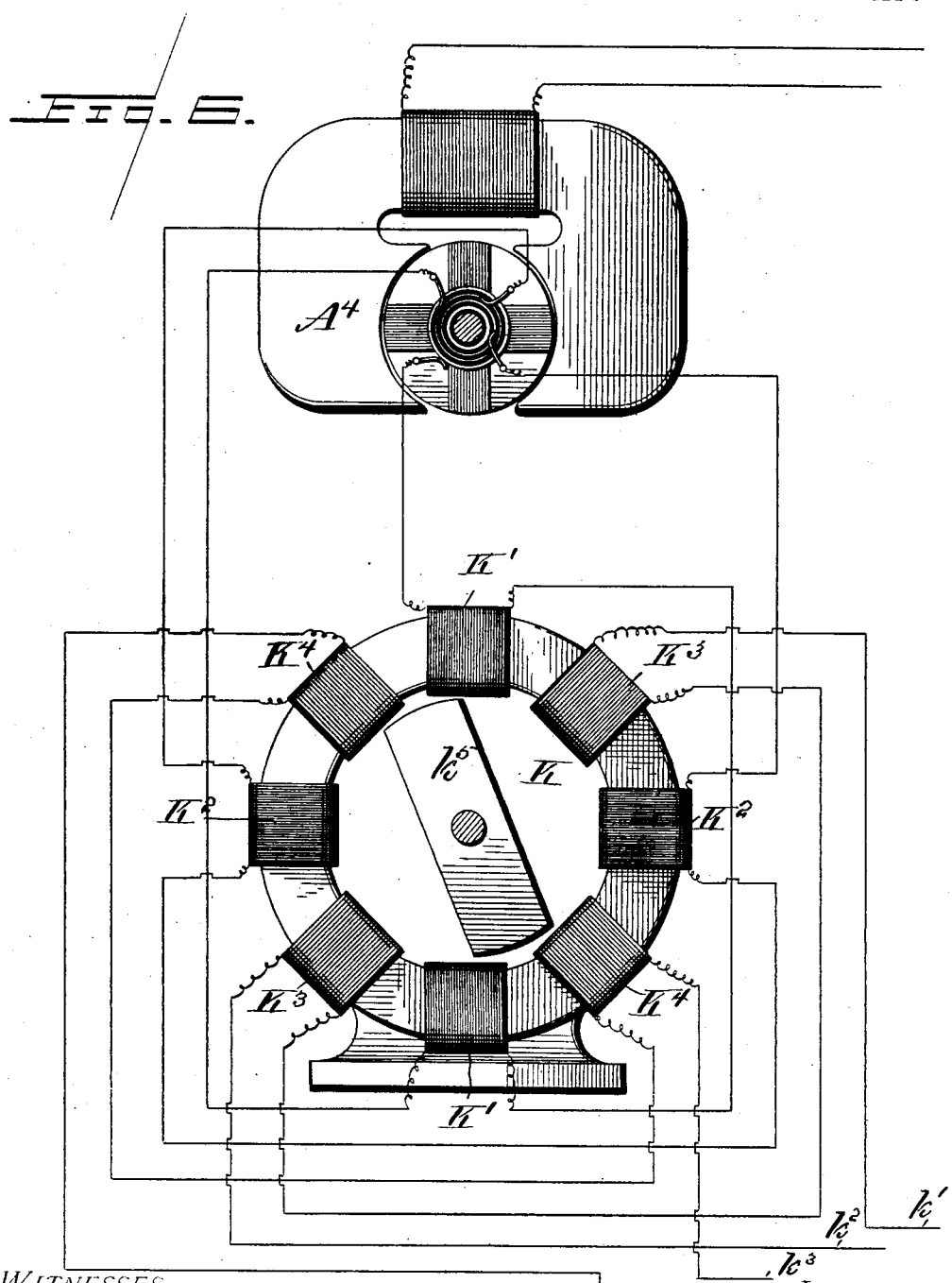

No. 763,774.  
Patented June 28, 1904.

UNITED STATES PATENT OFFICE.

MITFORD C. MASSIE, OF WASHINGTON, DISTRICT OF COLUMBIA, ASSIGNOR OF ONE-HALF TO MAX GEORGII, OF WASHINGTON, DISTRICT OF COLUMBIA.

ALTERNATING-CURRENT MOTOR.

SPECIFICATION forming part of Letters Patent No. 763,774, dated June 28, 1904.

Application filed February 12, 1904. Serial No. 193,298. (No model.)

*To all whom it may concern:*

Be it known that I, MITFORD C. MASSIE, a citizen of the United States, residing at Washington, in the District of Columbia, have invented certain new and useful Improvements in Alternating-Current Motors; and I do hereby declare the following to be a full, clear, and exact description of the invention, such as will enable others skilled in the art to which it appertains to make and use the same.

My invention relates to an improvement in alternating-current motors.

The general object of my invention is to provide an alternating-current motor which can be operated from a single-phase source of supply, which will be self-starting and independent of the particular frequency of said single-phase source of supply.

With this general object in view and some others which will be obvious to those skilled in the art from the description hereinafter my invention consists in a rotary field-motor and means for producing in said motor a rotary alternating field.

The rotary field produced in polyphase motors heretofore known has been considered analogous to the magnetic field which would be produced by rotating a horseshoe permanent magnet about an axis parallel to its legs or by rotating a direct-current electromagnet in the same way.

It is known that an electromagnet may be energized by alternating currents so as to produce effects similar to those of a direct-current electromagnet if the core of the magnet be well laminated.

The rotary field produced in a motor embodying my invention may be considered analogous to the magnetic field which would be produced by rotating an alternating-current electromagnet about an axis parallel to its limbs.

If $N \sin. 2\pi n_1 t + \theta$ represents the alternating magnetic flux of a transformer, (in which $N$ equals maximum strength of flux per unit of area equals amplitude of magnetic wave $2\pi n_1 t$ equals angle described by wave in time $t$ and $\theta$ equals epoch,) and if in this flux be placed a rotating secondary whose axis is at the center of the field and at right angles to said field, and if A represents the absolute area of the secondary, then as the said secondary rotates about its axis the flux which it incloses will vary as the sine of the angle $2\pi n_2 t$, through which the secondary has turned—that is, the cross-sectional area of the flux inclosed will be represented by the formula $A \sin. 2\pi n_2 t + \omega$, in which A equals absolute area equals amplitude, $2\pi n_2 t$ equals angle described by secondary in the time, $t$, and $\omega$ equals epoch; but as the inclosed flux is also varying the instantaneous value of the inclosed flux is represented by the equation:

$$y = AN \sin. 2\pi n_1 t + \theta \sin. 2\pi n_2 t + \omega.$$

Let $k$ equal the ratio of the angle $2\pi n_1 t$ to the angle $2\pi n_2 t$, such that $n_2 = \frac{n_1}{k}$. Substituting, we have $$y = AN \sin. 2\pi n_1 t + \theta \sin. 2\pi \frac{l}{k} n_1 t + \omega.$$

The electromotive force in the secondary due to this variable flux will be $$E = -\frac{dy}{dt} = -AN\, 2\pi\, n_1 \left\{ \sin. (2\pi \tfrac{n_1}{k} t + \omega) \cos. (2\pi n_1 t + \theta) \right.$$
$$\left. + \tfrac{l}{k} \sin. (2\pi n_1 t + \theta) \cos. (2\pi \tfrac{n_1}{k} t + \omega) \right\}$$

If $\omega = 0$, we have $$E_1 = -AN\, 2\pi\, n_1 \left\{ \sin. (2\pi \tfrac{n_1}{k} t) \cos. (2\pi n_1 t + \theta) \right.$$
$$\left. + \tfrac{l}{k} \sin. (2\pi n_1 t + \theta) \cos. (2\pi \tfrac{n_1}{k} t) \right\}$$

If $\omega = 90°$, we have $$E_2 = -AN\, 2\pi\, n_1 \left\{ \sin. (2\pi \tfrac{n_1}{k} t + 90°) \cos. (2\pi n_1 t + \theta) \right.$$
$$\left. + \tfrac{l}{k} \sin. (2\pi n_1 t + \theta) \cos. (2\pi \tfrac{n_1}{k} t + 90°) \right\}$$

This latter equation, however, may be put in the following form:

$$E_2 = -AN\, 2\pi\, n_1 \left\{ \cos. (2\pi \tfrac{n_1}{k} t) \cos. (2\pi n_1 t + \theta) \right.$$
$$\left. - \tfrac{l}{k} \sin. (2\pi n_1 t + \theta) \sin. (2\pi \tfrac{n_1}{k} t) \right\}$$

If these two electromotive forces be impressed upon the respective circuits of a two-phase motor, the resultant will be $$E_{1+2} = -AN\, 2\pi\, n_1 \sqrt{\frac{(\cos^2 2\pi n_1 t + \theta + \frac{l}{k^2}\sin^2 2\pi n_1 t + \theta)}{(\sin^2 2\pi \frac{n_1}{k} t + \cos^2 2\pi \frac{n_1}{k} t)}}$$

This expression represents an elliptically-rotating vector whose instantaneous value is $$\sqrt{(\cos^2 2\pi n_1 t + \theta + \tfrac{l}{k^2}\sin^2 2\pi n_1 t + \theta)},$$

the said vector completing its orbit in synchronism with the alternating magnetic field—that is to say, the vector of the ellipse is in synchronism with the primary current of the transformer, while the axis of the ellipse rotates in synchronism with the rotation of the secondary of the transformer.

At starting, when $k$ may be considered as infinite, the vector is a true alternating vector, while when $k$ becomes $l$ the ellipse becomes a circle and a true rotary field results. As, however, the vector is acting in the field-core of the motor, we may transfer the various instantaneous values of the elliptically-rotating vector to a circle representing the diameter of the field-core, and we obtain a diagram something like Figure 1, which is plotted to show the relative instantaneous values of the vector when $k=10$. In this diagram the axis of the figure is shown by the dotted line $xx$. This axis and the whole diagram will rotate in synchronism with the rotations of the secondary. The portion of the radius intercepted between the outer and inner curves will represent the relative strength and direction of the vector when in that part of the field of the motor. It will be noted that at the axis of the figure the vector is a maximum, positive on one side and negative on the other side of the figure.

If the armature of the motor be continuously provided with poles which are always opposite in sign to the vector and such armature be set behind the axis of the said figure, as indicated by the parallelogram P, the axis of which is indicated by the dotted line $p\,p$, Fig. 1, the armature will be attracted forward toward the axis of the figure and will turn the secondaries of the transformer if connected to them, whereby the axis of the figure will be shifted forward ahead of the armature, thus keeping up the forward movement of the armature and producing rotation of said armature and of the axis of the figure.

If the armature be set slightly ahead of the axis of the figure, the rotation of the armature will be in the opposite direction and the elliptical vector will also be caused to rotate in the opposite direction.

The poles of the armature may be produced either by induction from the elliptical vector or, preferably, by a winding on said armature which is connected to the primary source of supply. This being alternating will cause the poles to change sign in synchronism with the change of sign of the elliptical vector. It is clear that at starting where the elliptical vector has an orbit whose semiminor axis, $$\frac{l}{k}\sin. 2\pi\, n_1 t + \theta = 0,$$

the armature is being attracted wholly by a true alternating vector, and if directly in line with the same would not be moved; but by the angular displacement of the armature to one side of the vector, as hereinbefore described, the armature will start in rotation, and thus produce the elliptical field, the torque depending upon the strength of field due to the alternating vector where an unwound armature is used or upon the product of the field produced by the alternating vector and the strength of pole produced by the current in the armature-windings when the latter are employed. In the latter case by varying this armature-current the torque may be varied.

When the motor is started, the vector becomes an elliptically-rotating one, and while at its position of maximum strength—viz., when close to the axis of its ellipse or to the axis of the diagram shown in Fig. 1—it is always attracting the armature in the direction of its rotation. In some other portions of its orbit it may be tending to attract the armature in a reverse direction, and thus is doing negative work. At the moment of starting, when $k$ is infinite the said negative work is zero; but as $k$ decreases the said negative work increases until when $k=l$—that is, at synchronism—the negative work is equal to the positive work. In order, however, to avoid this, the armature may be supplied with a suitable winding to be acted upon inductively by said vector. For example, the armature may have the usual squirrel-cage winding, such as is usual in polyphase motors, so that when said vector is rotating in synchronism with the alternating flux of the transformer it will always be doing positive work upon the armature.

With this introductory explanation I will now describe some specific structures embodying my invention in the preferred forms, reference being made to the accompanying drawings.

In the drawings, Fig. 1 is a diagram referred to in explanation of my invention; Fig. 2, a diagrammatic view of an apparatus embodying my invention; Fig. 3, a side elevation of the same; Fig. 4, a diagrammatic view of another embodiment of my invention; Fig. 5, a side elevation of the motor, and Fig. 6 a diagrammatic view of another embodiment of my invention.

Referring to Figs. 2 and 3 of the drawings, $A'\, A^2$ are two transformers, each of which has a primary winding and a secondary winding, one of which windings is angularly adjustable with relation to the other. In the example given the primary windings are stationary, as indicated at $a'$ $a^2$, while the secondary windings $a^3$ $a^4$ are mounted on rotatable cores $a^5$ $a^6$, the secondary winding of one transformer being at right angles to the secondary winding of the other transformer, as will be clear from Fig. 2 of the drawings.

B indicates any desired two-phase motor having two sets of field-windings at right angles to each other, as indicated at $b'$ $b^2$. The terminals of the set of coils $b'$ are connected to the terminals of the secondary windings of one transformer—as, for example, the transformer A'—while the terminals of the other set of coils $b^2$ are connected to the terminals of the secondary windings of the other transformer $A^2$, a pair of collector-rings and brushes being supplied to each transformer for this purpose, the rings being indicated at $a^7$, $a^8$, $a^9$, and $a^{10}$, while the brushes are illustrated at $a^{11}$, $a^{12}$, $a^{13}$, and $a^{14}$.

The rotatable cores of the transformer are fixed on a common shaft C, arranged to be driven by the armature-shaft C' of the rotary field-motor—for example, by making them in one, as shown in the drawings.

The motor B is provided with any desired armature—as, for example, the laminated-iron armature B', illustrated in the drawings, which is capable of having its magnetism rapidly reversed.

It will be understood by those skilled in the art that when a single-phase current is supplied to the primary windings of each transformer an alternating magnetic flux will be set up in the magnetic circuit of the said transformers. When a secondary winding of a transformer is in its position at right angles to the said magnetic flux, the secondary current induced in said winding will have the maximum amplitude, and as the secondary is rotated from this position to a position parallel to the magnetic flux the amplitude of the secondary current will be gradually reduced until at the parallel position it becomes practically zero. Consequently with two secondaries at right angles to each other the amplitude of one secondary current will be a maximum while that of the other is a minimum, and vice versa, the amplitudes waxing and waning in a manner similar to that in which the instantaneous values of the ordinary two-phase currents wax and wane. In other words, the amplitudes of the successive waves of the two derived currents vary periodically, and the periodical variation of the amplitude of one current is out of phase with that of the other current. Therefore when one set of coils of the motor B is receiving an alternating current of maximum amplitude the other set of coils is receiving a current of minimum amplitude—that is to say, does not receive any current—and, vice versa, as the amplitude of the waves of current wanes in one set of coils the amplitude of the waves of the other current will increase in the other set of coils. In this way a polar line is formed which although alternating—that is to say, reversing its polarity in synchronism with the single-phase supply—will also rotate about a central axis. This rotating and alternating magnetic field of the motor will induce opposite alternating poles in the armature B', and by setting the latter so that its poles will be slightly behind the polar line of the field rotation of the armature will be produced, and as the secondaries of the transformers are moved by the armature they will change the amplitudes of the waves of currents in the two sets of motor-coils, increasing the amplitude in one set of coils while decreasing the amplitude of the waves of current in the other set of coils, thus causing the polar line to rotate progressively, which keeps up the rotation of the armature.

In the construction shown in Figs. 4 and 5 the two secondary windings are placed on one rotatable core, whereby the loss in transformation is reduced. The armature has the usual squirrel-cage winding. In addition it is provided with a ring-winding H, having two diametrically opposite points $h'$ $h^2$, connected to slip-rings $i'$ $i^2$, these points being slightly behind the polar line of the field. Besides this it has two diametrically opposite points $h^3$ $h^4$, slightly ahead of the polar line of the field, connected to slip-rings $i^3$ $i^4$. Alternating current from the single-phase source of supply may be furnished to the slip-rings $i'$ $i^2$ or to the slip-rings $i^3$ $i^4$. In the former case a polar line will be formed in the armature slightly behind the polar line of the field, whereby the armature will run forward, while in the latter case the polar line of the armature will be formed slightly forward of the polar line of the field, and the armature will therefore rotate in the opposite direction. I indicates a switch for making these changes of connection, and I' is a controlling device in the form of a choking-coil whose core may be moved in or out to vary the current supplied to the motor-armature, whereby the torque of the motor is varied.

When the armature reaches synchronism, the rotating polar line no longer alternates, but acts just as in an ordinary polyphase motor. Hence the current to the ring-winding H of the armature may be cut off, and the motor then runs as an ordinary polyphase motor.

It may be desirable instead of feeding the two currents direct from the rotating secondaries to the polyphase motor to first supply a rotary field-transformer with said two currents and then take from such transformer the desired polyphase currents. Such a structure is indicated in Fig. 6, where K is a rotary field-transformer having the primaries K' K² connected to the respective rotating secondaries of the rotary transformer A⁴ and having secondaries K³ K⁴ arranged to produce two currents at ninety degrees apart. The said two currents may then be fed to any ordinary polyphase motor (not shown) through the terminals $k'\ k^2\ k^3\ k^4$. In this construction instead of rotating the secondaries by the polyphase motor the rotary field-transformer K may be provided with an armature $k^5$, mounted on the shaft of the secondary and arranged to drive the same. By this device the secondaries may be kept in continuous rotation at synchronism with the primary current while sine-wave two-phase currents are fed to the polyphase motor, which may be varied in speed as desired.

What I claim, and desire to secure by Letters Patent, is—

1. The combination, with means for developing a plurality of alternating currents whose successive waves vary in amplitude periodically, the periodical variations of the amplitudes of the waves of the different currents being out of phase with relation to each other, of a polyphase translating device having its respective circuits energized by the respective alternating currents.

2. The combination, with means for developing a plurality of alternating currents, the successive waves of each current varying in amplitude periodically according to a sine law, the periodical variation of the amplitude of the waves of one current being out of phase with the periodical variation of the amplitude of the waves of another current, of a polyphase translating device having its respective circuits energized by the respective alternating currents.

3. The combination, with a source of alternating current, and means for changing the current from said source into a plurality of periodic currents, each of which has the amplitude of its successive waves varying periodically, the periodical variation of the amplitude of the waves of one current being out of phase with the periodical variation of the amplitude of the waves of the other current or currents, of a polyphase translating device having its respective circuits energized by the respective alternating currents.

4. The combination, with a source of alternating current, and means for changing the current from said source into a plurality of periodic currents, each of which has the amplitude of its successive waves varying periodically, the periodical variation of the amplitude of the waves of one current being out of phase with relation to the periodical variation of the amplitude of the successive waves of the other current or currents, of a polyphase motor having its respective circuits energized by the respective alternating currents, and connections between said motor and said means whereby the latter is operated by the former.

5. The combination, with a single-phase source of supply, of a plurality of secondaries arranged to be energized inductively by said single-phase source of supply, said secondaries having a fixed angular relation to each other and being rotatable with relation to their inducing source, a motor having a plurality of stator windings arranged to be energized from the respective secondaries, and means for giving the secondaries any desired speed of rotation relative to the frequency of the single-phase source of supply.

6. The combination, with a single-phase source of supply, of a plurality of secondaries arranged to be energized inductively by said source of supply, said secondaries having an angular relation to each other and being angularly adjustable with relation to the inducing source; a polyphase motor having windings connected to the respective secondaries, and mechanism intermediate said motor and the secondaries whereby the secondaries are rotated by the motor.

7. The combination, with a single-phase source of supply, a plurality of secondaries arranged to be inductively energized by said single-phase source of supply, said secondaries having an angular relation to each other and being angularly adjustable with respect to the inducing source, and a polyphase motor having the respective windings of one of its members connected to the respective secondaries and having its other member provided with windings arranged to be energized from the single-phase source of supply.

8. The combination, with a single-phase source of supply, a plurality of secondaries arranged to be inductively energized by said single-phase source of supply, said secondaries having an angular relation to each other and being angularly adjustable with respect to the inducing source, a polyphase motor having the respective windings of one of its members connected to the respective secondaries and having its other member provided with windings arranged to be energized from the single-phase source of supply, and mechanism intermediate said motor and the rotary secondaries whereby the latter are rotated by the motor.

9. The combination, with a single-phase source of supply, a plurality of rotatable secondaries having an angular relation to each other and arranged to be inductively energized from the single-phase source of supply, of a stator and a rotor, one of which is provided with a plurality of windings electrically connected to the rotatable secondaries, the other of which is provided with an inductively-energized winding, and means for rotating the secondaries from the said rotor.

10. The combination, with a single-phase source of supply, a plurality of rotatable secondaries having an angular relation to each other and arranged to be inductively energized from the single-phase source of supply, of a stator and a rotor, one of which has a plurality of windings electrically connected to the rotatable secondaries, the other of which has a closed-circuit winding in inductive relation to the plurality of windings of the other member and has a winding energized from the single-phase source of supply, and means for rotating the secondaries from the said rotor.

In testimony whereof I affix my signature to this specification in the presence of two witnesses.

MITFORD C. MASSIE.

Witnesses:
F. C. ALEXANDER,
PETER FLINT.

---

Corrections in Letters Patent No. 763,774.

It is hereby certified that in Letters Patent No. 763,774 granted June 28, 1904, upon the application of Milford C. Massie, of Washington, D. C., for an improvement in "Alternating-Current Motors," errors appear in the printed specification requiring correction, as follows: In the formulæ and the explanation thereof the letter "l" wherever it appears should read $1$; and that the said Letters Patent should be read with these corrections therein that the same may conform to the record of the case in the Patent Office.

Signed and sealed this 12th day of July, A. D., 1904.

[SEAL.]

E. B. MOORE,
*Acting Commissioner of Patents.*